Nov. 5, 1968  G. RECHMEIER ET AL  3,409,511
PLURAL STAGE DISTILLATION OF VINYL CHLORIDE WITH GAS RECYCLE
TO THE REACTION ZONE
Filed Jan. 23, 1967
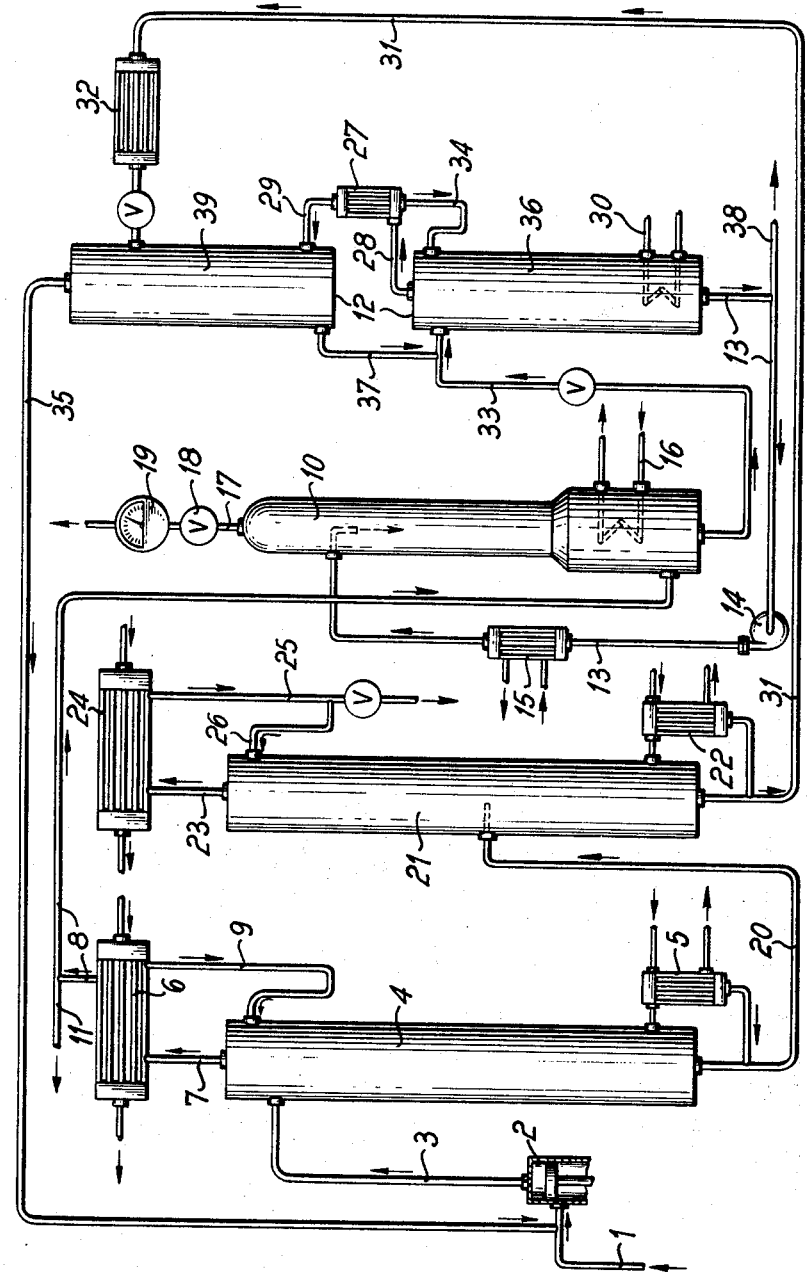

United States Patent Office 3,409,511
Patented Nov. 5, 1968

3,409,511
PLURAL STAGE DISTILLATION OF VINYL CHLORIDE WITH GAS RECYCLE TO THE REACTION ZONE
Gerhard Rechmeier, Kierdorf, and Armin Jacobowsky, Knapsack, near Cologne, Germany, assignors to Knapsack Aktiengesellschaft, Cologne, Germany, a corporation of Germany
Filed Jan. 23, 1967, Ser. No. 611,052
Claims priority, application Germany, Mar. 8, 1966, K 58,661
7 Claims. (Cl. 203—42)

ABSTRACT OF THE DISCLOSURE

Crude vinyl chloride obtained by the reaction of acetylene with hydrogen chloride and contaminated with inert gases, acetylene and higher-chlorinated $C_2$-hydrocarbons is worked up by dilution of the acetylene with gas mixture. Acetylene previously allowed to escape can be recovered, and vinyl chloride free from higher-chlorinated $C_2$-hydrocarbons is produced.

---

The present invention relates to a process wherein crude vinyl chloride obtained by the reaction of acetylene with hydrogen chloride is worked up by being subjected to distillation under pressure, and is an improvement in or modification of the process forming the subject of U.S. Patent 2,875,586.

In accordance with that patent, gaseous vinyl chloride, obtained by the reaction of acetylene with hydrogen chloride and contaminated with inert gases, acetylene and higher-chlorinated $C_2$-hydrocarbons, is purified by compressing the crude gas, without dissipation of the heat of compression, under a pressure of 3 to 10 atmospheres gauge, preferably 5 to 6 atmospheres gauge, and thereafter introducing under pressure the hot gas, which has a temperature between 15 and 90° C., preferably between 50 and 70° C., into a first distillation column, in which inert gases and unreacted acetylene are separated. The crude gas escaping at the head of the column is cooled in a condenser down to a temperature of about 15 to 20° C., whereby the bulk of the vinyl chloride and of the higher-chlorinated $C_2$-hydrocarbons is liquefied and refluxed into the sump of the column, whilst uncondensable inert gases and residual acetylene as well as uncondensed vinyl chloride vapors are introduced into the lower portion of a scrubbing column, in which residual vinyl chloride is isolated. In that scrubbing column, the residual vinyl chloride is freed from the inert gases by scrubbing them in countercurrent manner with a suitable solvent, for example chlorinated methane, ethane or ethylene, preferably dichloroethane, or is freed from the higher-chlorinated $C_2$-hydrocarbons contained in the crude gas, so as to obtain a solution formed of scrubbed vinyl chloride in the sump of the scrubbing column, and the purified inert gases and acetylene are released and thereafter allowed to escape at the head of the scrubbing column into the atmosphere.

The bulk of pure vinyl chloride is produced by introducing the gaseous portion of product obtained in the sump of the first distillation column into a second distillation column, in which the said gaseous portion is distilled under a pressure 0.5 to 1 atmosphere gauge lower than that prevailing in the first distillation column, pure vinyl chloride being obtained as the head product, which is liquefied in a condenser, released and collected in a reservoir. Vinyl chloride is expelled from the material introduced into the second distillation column only as long as the concentration of the higher-chlorinated $C_2$-hydrocarbons in the sump of the second distillation column is not higher than about 40% by weight. A portion of the vinyl chloride-containing product accumulating in the sump of the second distillation column is continuously supplied, together with scrubbing solution coming from the scrubbing column, to a third distillation column, in which vinyl chloride is expelled at atmospheric pressure at a sump temperature of 85° C. and combined with uncompressed starting gas to be purified. The higher-chlorinated $C_2$-hydrocarbons accumulating in the sump of the third distillation column are continuously withdrawn, compressed under a pressure corresponding to the overpressure prevailing in the scrudbbing column, and thereafter used as the scrubbing liquid for scrubbing the vinyl chloride-containing inert gases flowing into the scrubbing column.

The process described above is beset with various disadvantages which substantially affect its economy. It has been found that the vinyl chloride- and acetylene-containing inert gases are only unsatisfactorily purified inside the scrubbing column, because the scrubbing liquid only enables the vinyl chloride to be completely removed from the inert gases. However, the inert gases, which are expelled from the scrubbing column and released to escape into the atmosphere, also contain 50% by volume acetylene that is accordingly lost. It has furthermore been found that the third distillation column, in which the sump product coming from the second distillation column and the scrubbing column are freed from further dissolved vinyl chloride, has an insufficient separation efficiency. The vinyl chloride, expelled from the sump of the third distillation column at atmospheric pressure, at a temperature of 75° C., cooled in a following condenser down to about 20° C. and liquefied, has been found still to contain about 10 to 15% by weight dichloroethane or higher-chlorinated $C_2$-hydrocarbons dissolved therein which are returned to the starting gas to be purified, in which they increase the concentration of the higher-chlorinated $C_2$-hydrocarbons that are undesirable by-products.

It has now been found that the disadvantages mentioned above can be obviated using conditions other than those used in the above earlier process which is thus rendered considerably more economic.

The process of the present invention for working up crude vinyl chloride, obtained by reaction of acetylene and higher-chlorinated $C_2$-hydrocarbons, wherein (a) crude, predried and gaseous vinyl chloride, compressed under a pressure of 3 to 10 atmospheres gauge and having a temperature of 15 to 90° C., is introduced into a first distillation column, in which the bulk of the vinyl chloride and of the higher-chlorinated $C_2$-hydrocarbons is liquefied by cooling in a condenser associated with that column, and the resulting condensed matter is recycled into the sump of that column; wherein (b) uncondensed matter formed of inert gases, acetylene and vinyl chloride in vapor form is removed from the condenser and the vinyl chloride in vapor form is recovered by scrubbing that uncondensed matter with a liquid chlorinated hydrocarbon, preferably with the higher-chlorinated $C_2$-hydrocarbons contained in the crude gas, in a scrubbing column under pressure, and gas free from vinyl chloride is expelled at the head of that scrubbing column and a scrubbing solution containing vinyl chloride is accumulated in the sump of that scrubbing column; wherein (c) the product accumulating in the sump of the first distillation column is freed from the bulk of the vinyl chloride in a second distillation column under a pressure lower than that prevailing in the first distillation column, as long as the concentration of the higher-chlorinated $C_2$-hydrocarbons accumulating in the sump of the second distillation column is not higher than at most about 40% by weight; wherein (d) pure vinyl chloride is removed at the head of that second distillation column, liquefied by being cooled and collected in a reservoir; wherein (e) residual vinyl chloride together with scrubbing solution coming from the scrubbing column is recovered from the sump of the second distillation column, by distillation of this mixture in a third distillation column at atmospheric pressure or under slight overpressure, the vinyl chloride escaping as the head product of that third column being combined with uncompressed crude vinyl chloride to be purified; and wherein (f) the sump product of that third column and formed of higher-chlorinated $C_2$-hydrocarbons is refluxed as the scrubbing liquid into the scrubbing column, comprises more especially using a portion of the gas mixture leaving the condenser associated with the first distillation column as a diluent for the acetylene used for the production of vinyl chloride from acetylene and hydrogen chloride.

The residual portion of that gas mixture is introduced under pressure into the scrubbing column to be scrubbed therein in countercurrent fashion with precooled scrubbing liquid, whereby inert gases free from acetylene and vinyl chloride escape at the head of the scrubbing column, the vinyl chloride-containing products accumulating in the sump of the second distillation column and the scrubbing column are freed from residual vinyl chloride and unreacted acetylene by introduction of the sump product coming from the scrubbing column into a third distillation column, in which the vinyl chloride and the residual acetylene are expelled by heating the said sump product at atmospheric pressure or under slight overpressure, the ascending vinyl chloride vapors being intimately contacted in countercurrent fashion, in the upper portion of the third distillation column, with sump product originating from the second distillation column, released to identical pressure and cooled down to about 0 to $-10°$ C., vinyl chloride in vapor form being removed in admixture with acetylene at the head of the third distillation column and combined with uncompressed crude vinyl chloride to be purified, and the product accumulating in the sump of the third distillation column and formed of the higher chlorinated $C_2$-hydrocarbons being recycled as the scrubbing liquid into the scrubbing column.

To ensure the explosion-proof manipulation of the compressed acetylene, it has been found advantageous to use about 80 to 90% by volume of the gas mixture leaving the condenser of the first distillation column as the diluent for the starting components in manufacturing vinyl chloride from acetylene and hydrogen chloride.

The residual portion of gas mixture not condensed in the condenser associated with the first distillation column is scrubbed in a series-connected scrubbing column under a pressure the same as that maintained in the first distillation column, preferably under a pressure of 5 to 6 atmospheres gauge, the scrubbing liquid being one of those mentioned above, particularly dichloroethane or the higher-chlorinated $C_2$-hydrocarbons contained in the crude gas. The scrubbing liquid should be used at a temperature of about 10 to 25° C, preferably 18° C. This temperature is reached by cooling the scrubbing liquid, before it is being allowed to enter into the scrubbing column and by the provision of means permitting the scrubbing liquid to be cooled further inside the scrubbing column. The heat to be dissipated can be determined by means of the heat of solution of the gas mixture to be purified in the scrubbing liquid. The step of cooling not only ensures that the vinyl chloride contained in the gas mixture is completely dissolved in the scrubbing liquid, it also ensures that all of the acetylene is completely expelled from the gas mixture, which means that only inert gases escape into the atmosphere, at the head of the scrubbing column.

The third distillation column being operated at atmospheric pressure or preferably under slight overpressure, for example of up to about 0.1 atmosphere gauge, it is necessary that the sump product coming from the scrubbing column be released, before introduction into the third distillation column, to have a pressure corresponding to that prevailing in the third distillation column.

The vinyl chloride and residual acetylene are then expelled in the third distillation column at a temperature of about 70 to 90° C., preferably 75° C., in the still of the column.

A preferred feature used in operating the third distillation column comprises spatially separating the upper half of the column from the lower half and making the two halves to communicate with one another by means of a reflux condenser maintained at a temperature of about 15° C. The vinyl chloride vapors as well as acetylene and scrubbing liquid in vapor form expelled from the lower half column are cooled, once they left that lower half column, down to about 15° C. in that condenser.

The scrubbing liquid vapors are thereby liquefied and refluxed to the column, whereas the vinyl chloride and acetylene are intimately contacted in countercurrent fashion, in the upper half column, with sump product coming from the second distillation column. The mixture formed of vinyl chloride and acetylene leaving at the head of the upper half column is completely free from high-boiling contaminants, the higher-chlorinated $C_2$-hydrocarbons accumulating in the lower half column from which they can be withdrawn.

The advantages offered by the present invention over the process disclosed in U.S. Patent 2,875,586, reside in the fact that the acetylene previously allowed to escape together with inert gases into the atmosphere can be recovered and used for the production of vinyl chloride, and that the gas mixture formed of vinyl chloride and residual acetylene leaving at the head of the third distillation column is free from higher-chlorinated $C_2$-hydrocarbons.

The accompanying flow scheme illustrates the process of the present invention.

As shown therein, crude vinyl chloride obtained by the reaction of acetylene with hydrogen chloride in the presence of inert gases and contaminated with higher-chlorinated $C_2$-hydrocarbons as well as with unreacted acetylene, is caused to flow through line 1 to compressor 2 in which it is compressed, without dissipation of the heat of compression, under a pressure of 3 to 10 atmospheres gauge, the crude gas being thereby heated to a temperature of 15 to 90° C. The compressed gas is introduced through line 3 into the first distillation column 4 which carries a circulation evaporator 5 and a condenser 6, and it is separated therein into a sump product, formed predominantly of vinyl chloride and higher-chlorinated $C_2$-hydrocarbons, and into a head product formed of inert gases, uncondensed vinyl chloride and unreacted acetylene, the head product leaving column 4 through line 7 and being subdivided, after having passed condenser 6 through line 8, into two gas streams. A partial stream which contains the bulk of the inert gases, is refluxed through line 11 into the contact furnace (not shown in the drawing) used for the production of vinyl chloride, the balance portion of that inert gas stream travelling through line 8 to scrubbing column 10. The portions of the crude gas mixture liquefied in condenser 6 are refluxed through line 9 to column 4 and heated again in circulation evaporator 5 to a temperature of 40° C.

The gas stream introduced into scrubbing column 10 is scrubbed, in countercurrent fashion and under a pressure the same as that prevailing in the first distillation column 4, with the sump product formed of higher-chlorinated $C_2$-hydrocarbons and removed from the third distillation column 12 through line 13 with the aid of pump 14, and is thereby freed from all of the vinyl chloride, the scrubbing liquid having been precooled in cooler 15 down to a temperature of about 18° C. Scrubbing column 10 has an associated cooling means 16 for the dissipation of the heat of solution, the cooling means 16 maintaining the scrubbing liquid at its initial temperature of about 18° C. The head product of scrubbing column 10 is formed of inert gases free from vinyl chloride and acetylene which are expelled through line 17 incorporating a release valve 18 and a gasometer 19, and scrubbing liquid is the sump product of scrubbing column 10. To produce pure vinyl chloride, the sump product of the first distillation column 4 is introduced through line 20 into the second distillation column 21, in which the bulk of the vinyl chloride is expelled under a pressure of 4.5 atmospheres gauge and at a sump temperature of 42–45° C. as long as the concentration of the higher-chlorinated $C_2$-hydrocarbons accumulating in the sump is not higher than at most about 40% by weight. Circulation evaporator 22 is intended to expel vinyl chloride from the sump product of the second distillation column 21. The vinyl chloride vapors escaping at the head of column 21 through line 23 are liquefied in condenser 24 and removed through line 25. A portion of the liquefied vinyl chloride is refluxed through reflux line 26 to column 21. In the third distillation column 12, residual vinyl chloride and acetylene contained in the sump products of the second distillation column 21 and scrubbing column 10 are recovered. The third distillation column 12 is subdivided into an upper half column 39 and a lower half column 36, the two halves communicating with one another by means of condenser 27 which has a supply line 28 and a discharge line 29 connected thereto. In the lower half column 36 there is a heating means 30 for heating the sump product accumulating therein to a temperature of about 85° C. Residual vinyl chloride contained in the sump product of the second distillation column 21 is isolated by precooling that product in cooler 32 down to a temperature of about 16° C., releasing it to a pressure of 1–1.1 atmospheres absolute and thereafter introducing it through line 31 into the upper half column 39, in which it is cooled down to −10° C. and intimately contacted in countercurrent fashion with vinyl chloride vapors ascending from the lower half column. The lower half column 36 is fed through line 33 with the sump product coming from scrubbing column 10 and maintained under a pressure of 1–1.1 atmospheres absolute, which is heated to a temperature of about 75° C. to expel vinyl chloride and acetylene. Gas escaping at the head of the lower half column is cooled in condenser 27 down to about 15° C., and the liquefied portion of the scrubbing liquid vapors is refluxed through reflux line 34 to the column, whereas the gaseous portion thereof passes through the upper half column 39, is removed through line 35 and combined with crude gas before entering compressor 2. The higher-chlorinated $C_2$-hydrocarbons which travel from the upper half column 39 through line 37 into the lower half column 36 are collected in the sump of that lower half column, withdrawn through line 13 and either returned to scrubbing column 10 or withdrawn at discharge place 38.

We claim:

1. In the process for working up crude vinyl chloride, obtained by the reaction of acetylene with hydrogen chloride and contaminated with inert gases, acetylene and higher-chlorinated $C_2$-hydrocarbons, which process comprises (a) introducing crude, predried and gaseous vinyl chloride, compressed under a pressure of 3 to 10 atmospheres gauge and having a temperature of 15 to 90° C., into a first distillation column, in which the bulk of the vinyl chloride and of the higher-chlorinated $C_2$-hydrocarbons is liquefied by cooling in a condenser associated with that column, and recycling the resulting condensed matter into the sump of that column; (b) removing uncondensed matter comprising inert gases, acetylene and vinyl chloride in vapor form from the condenser and recovering the vinyl chloride in vapor form by scrubbing that uncondensed matter with a liquid chlorinated hydrocarbon in a scrubbing column under pressure, and expelling gas free of vinyl chloride at the top of said scrubbing column and accumulating a scrubbing solution containing vinyl chloride in the sump of said scrubbing column; (c) freeing product accumulating in the sump of the first distillation column from the bulk of the vinyl chloride in a second distillation column under a pressure lower than that prevailing in the first distillation column, as long as the concentration of the higher-chlorinated $C_2$-hydrocarbons accumulating in the sump of the second distillation column does not exceed about 40% by weight; (d) removing pure vinyl chloride at the top of that second distillation column, liquefying it by cooling and collecting it; (e) recovering residual vinyl chloride together with scrubbing solution coming from the scrubbing column, from the sump of the second distillation column, by distillation of this mixture in a third distillation column; the vinyl chloride escaping as the overhead product of said third column being combined with uncompressed crude vinyl chloride to be purified; and (f) refluxing the sump product of said third column and comprised of higher-chlorinated $C_2$-hydrocarbons as the scrubbing liquid into the scrubbing column; the improvement which comprises returning one portion of the gas mixture leaving the condenser associated with the first distillation column to the reaction zone as a diluent for the acetylene in the production of vinyl chloride from acetylene and hydrogen chloride, while introducing the balance portion of said gas mixture into the scrubbing column, and countercurrently scrubbing it under a pressure of about 5 to 6 atmospheres gauge with which has been precooled a temperature of about 10 to 25° C., whereby inert gases free of acetylene and vinyl chloride escape at the top of the scrubbing column.

2. The process of claim 1 wherein the scrubbing liquid has a temperature of about 18° C.

3. The process of claim 1 wherein the third distillation column is operated under a pressure varying between atmospheric pressure and 0.1 atm. gauge.

4. The process of claim 1 wherein the vinyl chloride-containing products accumulating in the sump of the second distillation column and the scrubbing column are freed from residual vinyl chloride and unreacted acetylene by introduction of the sump product coming from the scrubbing column into a third distillation column, in which the vinyl chloride and the residual acetylene are expelled by heating the said sump product, the ascending vinyl chloride vapors are intimately contacted in countercurrent fashion, in the upper portion of the third distillation column, with sump product originating from the second distillation column, released to identical pressure and cooled down to about 0 to −10° C., vinyl chloride in vapor form is removed in admixture with acetylene at the top of the third distillation column and combined with uncompressed crude vinyl chloride to be purified, and the product accumulating in the sump of the third distillation column and comprising the higher-chlorinated $C_2$-hydrocarbons is recycled as the scrubbing liquid into the scrubbing column.

5. The process of claim 1 wherein about 80 to 90% by volume of the gas mixture leaving the condenser of the first distillation column is used as the diluent for the acetylene reacting with hydrogen chloride.

6. The process of claim 1 wherein the compressed sump coming from the scrubbing column is released, before it is introduced into the third distillation column, to a pressure of about 0.1 atmosphere gauge, and vinyl chloride is then expelled into the third distillation column at a temperature of about 70 to 90° C.

7. The process of claim 1 wherein the higher-chlorinated $C_2$-hydrocarbons contained in the crude gas are used as the scrubbing liquid for scrubbing the uncondensed matter.

References Cited

UNITED STATES PATENTS

| | | | |
|---|---|---|---|
| 2,480,021 | 8/1949 | Hillyer | 260—656 |
| 2,816,148 | 12/1957 | Anderson et al. | 260—656 |
| 2,875,586 | 3/1959 | Pohl | 55—40 |
| 3,214,482 | 10/1965 | Caropreso et al. | 260—656 |

WILBUR L. BASCOMB, JR., *Primary Examiner.*